Patented July 31, 1928.

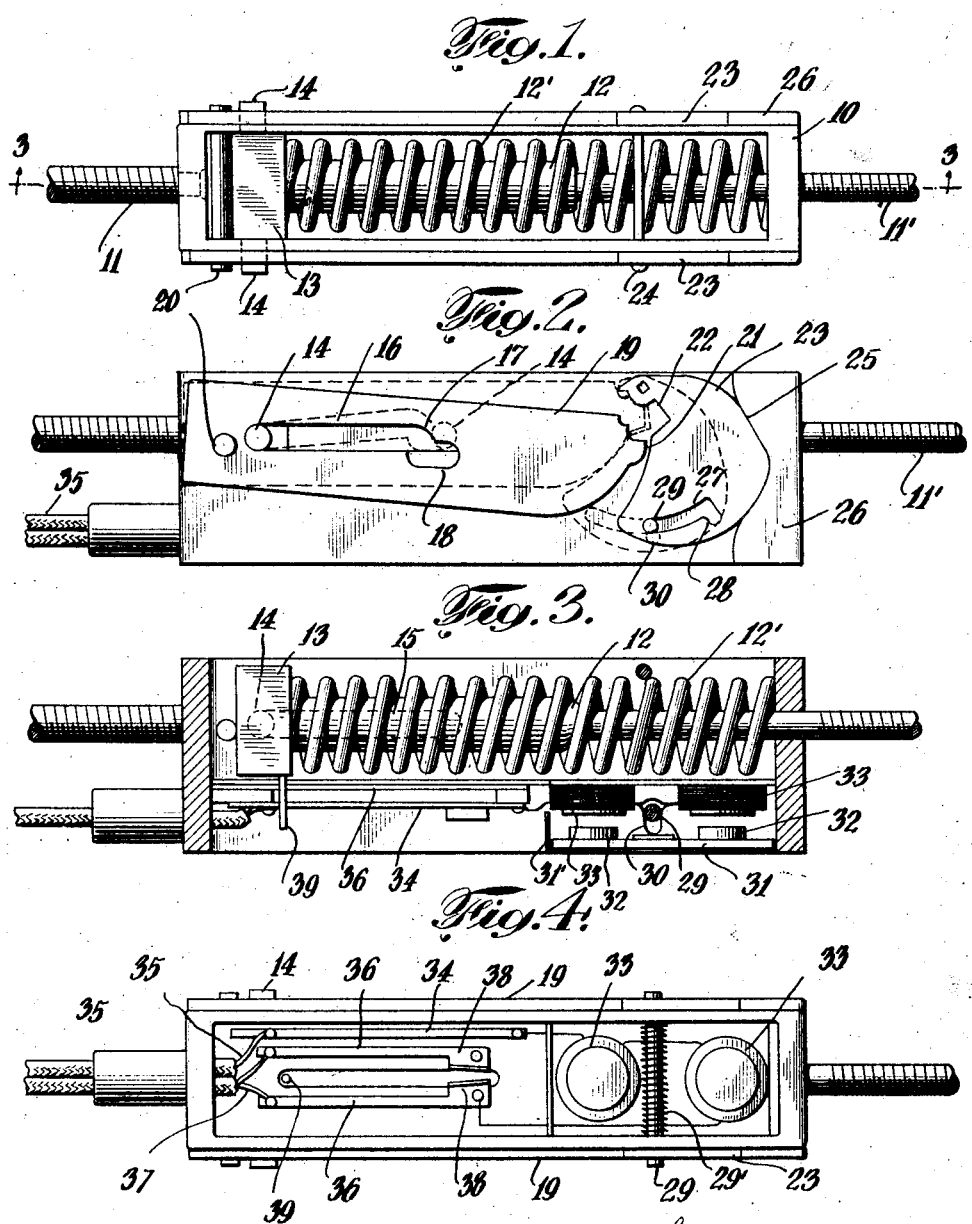

1,679,181

UNITED STATES PATENT OFFICE.

KARL O. SCHAUMAN, STIRLING R. YANCEY, AND JOSE L. MIFSUD, OF NEW YORK, N. Y., ASSIGNORS TO SURE-GUARD CORPORATION, OF NEW YORK, N. Y., A CORPORATION OF NEW YORK.

SPRING CONTROL.

Application filed June 23, 1927. Serial No. 200,800.

Our invention relates to improvements in what are termed spring controls and which are used for locking a spring under tension and which act, when the spring is released, to move connected parts. A familiar application of so-called controls of this type is to automatic vehicle controls in which the spring acts to apply brakes or operate other parts of the mechanism of a car, and to cut out the ignition, or do other work.

Our invention is intended to produce a simple, powerful and reliable spring control of this type which can be conveniently connected to or coupled with the brake rods of a vehicle or other braking means, and to produce means for locking the spring of the control under tension and for releasing it by the action of an electromagnet so that it will exert its tension at once on the brake rod, and will also act to operate other parts, and to open or close an electric circuit. The spring control forming our invention is especially applicable to the above use, but on the other hand it may have other uses and is intended to connect with any moving part in such a way that when the circuit is closed and the spring released, it will actuate said part.

Our invention also comprises certain features of construction which provide for the convenient re-setting, the sure locking and the instant tripping or releasing of the spring when a circuit is closed through its operating magnets.

Reference is to be had to the accompanying drawings in which similar reference characters represent the corresponding parts in all views.

Figure 1 is a plan view of one form of the device which embodies our invention showing the spring in released position.

Figure 2 is a side elevation of the structure shown in Figure 1.

Figure 3 is a longitudinal section on the line 3—3 of Figure 1, and

Figure 4 is an inverted or bottom plan view of the structure.

The spring has a suitable frame or casing 10 which is shown as rectangular and open at top and bottom, and this is the better though not essential form of the casing. The casing is shown at one end connected to a rod 11 which may be a part of the brake rod, and at the opposite end a complementary part 11' slides in the casing, both these parts 11 and 11' being shown as screwthreaded to facilitate coupling to a brake rod or the like. The part of the rod 11' which enters the casing is also preferably enlarged at its inner part as shown at 12 to better fit the main spring 12' which is a powerful spring and which is shown in the drawings in its released or extended position.

The spring at one end abuts with the inner wall of the casing and at the other end with a slide block 13 which moves lengthwise of the casing and has trunnions 14 slidable in the slots 15 shown by dotted lines in Figure 3 which extend lengthwise of the casing walls. These trunnions also enter the slots 16 in the arms 19 and the slot in each arm 19 is curved downward slightly near one end as shown in 17, Figure 2, and it merges into an off-set portion 18 in which the trunnion 14 rests when the arm is in its raised position as shown by dotted lines in Figure 2. The arm 19 is pivoted at one end as shown at 20 and its free end is curved or rounded and provided with an extension 21 which, when the free end of the arm is raised, enters the recess 22 of a trigger 23 which is secured to a pivoted shaft 24 extending transversely of the casing 10. The arm 23 is heavy enough to be pulled into or to swing by gravity to the position shown by dotted lines in Figure 2 when the arm 19 is raised, and when it is in the position shown by full lines in Figure 2, it fits in the recess 25 of the abutment 26. The device would operate all right with a single arm 19 and trigger 23, but we have shown these parts on both sides of the casing as this is better and makes a better balanced structure. It will be understood that the trigger 23 might be urged to its normal position by a spring, but we prefer to depend on gravity, or a pushing force.

The trigger 23 is provided with a curved slot 27 near its lower or free edge, which slot has near one end an off-set 28 which is adapted, when the trigger is swung to its normal position, to receive a locking pin 29 which is arranged transversely of the casing and extends across it so as to drop into the slot 28 to lock the trigger at the right moment. The casing 10 is slotted as shown at 30, to permit the pin 29 to drop into the slot 28 and this tendency of the pin to drop is augmented by the spring 29' which is coiled around the pin and at one end fastened to the casing, and at the other end to the pin in the usual or conventional way of effecting this result. Other means might be substituted for urging the pin downward.

The gun is set in locked position, that is with the spring 12' retracted and under tension, by pulling on the end 11' of the rod 11—11', which pulls back the block 13 and the trunnions 14 acting against the cam groove or slot in the part 17 lift the arms 19 so that the extensions 21 come opposite the recesses 22 of the triggers 23. This allows the trigger to swing to the position shown by dotted lines in Figure 2 and the trunnions 14 enter the off-set 18 of the slots 16 while the pin 29 drops into the slots 28 of the two triggers, and thus the recess 22 serves to prevent the displacement of the arms 19 and the pin 29 engaging in the off-set 28 locks the triggers 23. Thus the spring is held under tension.

The spring is released by electromagnets arranged in substantially the manner described below. A plate 31, preferably of iron, is arranged in a box 31' near one end of the casing, and on the lower side, and this plate is provided with pole pieces 32 arranged opposite the cores of the magnets 33 which are directly above it, and this plate 31, it will be seen, lies immediately below the pin 29. These magnets 33 are suitably connected to a conducting strip 34 in the lower part of the casing and to one of the contacts 38 described below. The strip 34 connects by the wire 35 with some circuit closing means not shown. Thus it will be seen that when the block 13 is drawn forward to place the spring 12' under tension, the pin 39 will enter between the contacts 38 and close the circuit 37. This circuit may include the ignition of a car and it may include visible and audible signals or both which are operated by the opening of the circuit 37. In structures of this kind the circuit through the magnets is generally closed automatically by the action of the bumper or the like, but so far as our invention is concerned, this circuit may be closed in any manner, and the spring 12' can be made to operate any adjacent part, but it is shown as adapted for connection with a brake rod.

Assuming that the spring 12' has been compressed, thus in effect lengthening the rod 11—11' and the circuit is closed through the magnets 33, the current flowing from the wire 35 through the strip 34, the magnetic contact strip 36 and wire 37. This causes the plate 31 to be lifted, thus lifting the locking pin 29 from the slots 28 and freeing the trigger 23, and as the trigger starts to swing under the action of the spring pressure, the arm 19 will also begin to drop, thus leaving the trunnions 14 free to slide in the slots 16 of the casing, and the spring 12' will instantly extend to the position shown in the drawings, thus in effect shortening the rod 11—11', or in other words pulling on the rod 11'. At the same time the pin 39 will leave the contacts 38, thus opening the circuit 37 and cutting out the ignition or whatever is included in said circuit 37.

We claim:

1. A spring control for vehicle brakes and parts, comprising a frame or casing adapted to connect with a support, a spring-pressed slide rod mounted in the casing and adapted to operate vehicle brakes and parts, a lock to hold the spring under tension, a trigger to release the lock, and electromagnetic means for releasing the trigger and lock to the action of the spring.

2. A spring control, comprising a casing, means for connecting the casing to a support, a spring pressed slide rod mounted in the casing, a pivoted locking arm mounted on the casing and provided with a longitudinal cam slot, a trunnion carried by the spring and running in the aforesaid slot, a trigger opposite the free end of the cam arm and having a recesss to receive a part of the cam arm when the trigger is in locked position, means for locking the trigger to hold the spring under tension, and magnetic means for releasing the trigger and locking arm to the action of the spring.

3. A spring control, comprising a casing, means connecting it to a support, a slide rod mounted in the casing and carrying a slide block, trunnions on the slide block, a tension spring held in the casing in abutment with the slide block, slotted locking arms pivoted on the casing with the slots receiving the aforesaid trunnions, a trigger pivoted opposite the ends of the aforesaid arms, and having a recess to receive an extension on the arms, means for locking the trigger in position to hold the spring retracted, and electromagnetic means for releasing the trigger and spring.

4. A structure of the kind described, comprising a casing having means for attachment to a support, a slide rod extending longitudinally of the casing, a slide block carried by the rod, a tension spring in the casing abutting with the slide block, a pivoted arm on the casing having a cam slot therein, a trunnion on the slide block entering the aforesaid slot, a swinging trigger having a recess therein complementary to an extension on the locking arm, means for locking the trigger, and electromagnetic means for releasing the trigger.

5. A spring control, comprising a casing having means for attachment to a support, a slide rod in the casing, a tension spring in the casing acting against an abutment on the slide rod, a trigger mechanism for locking the spring in retracted position, electromagnetic means for releasing the trigger mechanism, an electric circuit and means for opening and closing said circuit by the movement of the spring.

6. A structure of the kind described, comprising a casing having means for attachment to a support, a slide rod in the casing, an abutment on the rod, a spring acting against the aforesaid abutment, a trigger mechanism to hold the spring retracted, electromagnetic means for releasing the trigger mechanism, an electric circuit, and means carried by the aforesaid abutment for opening and closing said circuit.

7. A spring control, for vehicle brakes and parts comprising a casing having means for attachment to a support, a slide rod in the casing adapted to connect with said vehicle parts, a spring arranged to actuate said rod in one direction, a trigger mechanism to hold the spring retracted, a locking pin engaging the trigger of the trigger mechanism, and electromagnetic means for moving the pin to release said trigger.

8. A structure of the kind described, comprising a casing having means for attachment to a support, a slide rod in the casing carrying an abutment, a spring acting against the aforesaid abutment, a locking arm pivoted on the casing and having a cam slot therein, a trunnion on the abutment entering said cam slot, a swinging trigger having a recess complementary to an extension on the arm, said trigger having also a slot with an off-set therein, a pin on the casing entering said slot and movable in a slot in the casing, and an electromagnet for moving the said pin out of locking engagement with the off-set in the trigger slot.

9. In a structure of the kind described, the combination with the casing, the slide rod, and the spring for actuating said rod, of the swinging trigger having a slot with an off-set therein, an operative locking connection between the trigger and the spring, a locking pin movable in the casing and adapted to enter the off-set of the trigger slot, and an electromagnet for moving the locking pin from the said off-set of the trigger slot.

10. In a spring control for vehicle brakes and parts, the combination with the casing, the slide rod in the casing adapted to connect with said vehicle parts and the spring for actuating the rod, of the trigger operatively connected with the spring to hold it retracted, a movable locking pin to hold the trigger and spring in locked position, and an electromagnet arranged to move the locking pin and release the trigger and connected mechanism.

In testimony whereof, we have signed our names to this specification this 21st day of June, 1927.

KARL O. SCHAUMAN.
STIRLING R. YANCEY.
JOSE L. MIFSUD.